Patented May 27, 1930

1,760,289

UNITED STATES PATENT OFFICE

FRITZ STOEWENER, OF LUDWIGSHAFEN-ON-THE-RHINE, AND ERNST MÜNZING, OF NEUROSSEN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

HIGHLY-ACTIVE ADSORBENT AND CATALYTIC MASS

No Drawing. Application filed October 6, 1927, Serial No. 224,518, and in Germany October 13, 1926.

The present invention relates to the production of highly active adsorbents and catalytic masses from heterogeneous jellies.

We have found that hard, granular or moulded highly active adsorbents and catalytic masses may be produced by starting with a heterogeneous jelly, washing it, subjecting the said jelly in a moist state to mechanical homogenization (which expression does not comprise simple pressing of the jelly and breaking it up into pieces) until a not too thick homogeneous paste is obtained, and drying the paste after moulding the product, with or without pressure, prior to drying if desired. The mechanical treatment comprises grinding, beating, kneading, jolting and the like. The best method of performing the mechanical treatment is in the ball-mill or "kek mill" (a kind of colloid mill) or the washed moist jelly may be forced at high velocity under elevated pressure, preferably by the aid of gases or vapours, through one or more pipes of small diameter, the velocity attaining or exceeding 50 metres per second and being alternately increased and diminished for the purpose of extensively homogenizing the mass, by modifying the pressure or the diameter of the pipes. Electrolytes, peptizing agents, such as acids or alkali solutions may be added, in order to influence the formation of pores, during the washing stage or later, as for example during the mechanical treatment.

The process herein described is applicable to all heterogeneous jellies prepared from heterogeneous sols, i. e. sols from which parts have separated in flakes, and it is chiefly suitable in cases where coarse, purified, highly concentrated fragments of jelly are to be converted, by drying, into granular, active silica masses and also where the small fragments or sludgy waste jelly have to be converted into large granules. The small fragments or sludgy waste jellies remaining after the production of hard, granular adsorbents from homogeneous sols and jellies from which hard, granular masses hitherto could not be produced and which though themselves homogeneous, form heterogeneous masses; can also be transformed in the aforesaid manner into hard, granular adsorbents and so turned to value. In the latter case a homogeneous paste is produced by a far-going cementing of the small homogeneous jelly fragments which remain substantially coherent on careful drying.

The above method of working is chiefly suitable when large, purified lumps of only moderately concentrated heterogeneous jelly, such as are obtained for example by the decomposition of slags with acids, or by the hydrolysis of silicon tetrachloride, have to be converted into granular active silica by drying. Granular or moulded adsorbents such as active silica, active alumina, active iron hydroxid or catalytic masses of any desired hardness may be obtained from the corresponding heterogeneous jellified masses or precipitates. The mechanical treatment may be preceded or succeeded by pressing, which may be combined with moulding and the pressure applied may be smaller in proportion as the homogenization is greater. Products with pores of definite mean diameter may be obtained, or adsorbents containing coarse and fine active pores, in conjunction, if required, with larger cavities, by carrying out the mechanical treatment, in the moist state, with mixtures of heterogeneous jellies or precipitates prepared in various ways, the individual components possessing different pH values, preferably on the acid and alkaline sides, before drying. The homogeneous mass, of the highest possible plasticity, may be predried in any known or convenient manner, preferably at moderate temperature, for example by exposure to the air, in vacuo or in a current of air and may be finally treated at elevated temperatures, in rotary furnaces if desired. The mass, which is plastic before being dried, may be poured into trays and be separated into cubes, for example, by stamping devices, or the trays may be divided into suitable compartments.

In the preparation of the heterogeneous jellies or precipitates, it is immaterial whether the initial material consists of solid, soluble or insoluble, natural or artificial, silicates or silicate solutions, or substances such as $SiCl_4$, $SiF_4$ and the like, and whether acids, waterglass, alkalis, solutions of metallic salts, or water and the like be used as the decomposing agent. Another method of working is to first prepare a homogeneous sol, as for example from slag and acid, and then to produce a heterogeneous jelly or precipitate at will, by the addition of waterglass, $SiCl_4$, ammonia, alkali, or the like. It is sometimes advantageous to heat and stir the sol with the colloidal heterogeneous substances, especially with silica separated in flakes or even dried, in order to prevent the deposition of the latter prior to coagulation, and thereby to obtain the heterogeneous jelly. Jellies, which are prepared from waterglass solutions at the usual decomposition temperatures, with a sufficient amount of acid to effect neutralization, the silicate being stirred into the acid, are always heterogeneous if at least 160 grams of $SiO_2$ be present per litre of total liquid. At higher decomposition temperatures, even a smaller amount, for example 120 grams or less of $SiO_2$ per litre will be sufficient.

The purification is preferably carried on by washing in the filter press, as a slight pressure furthers the heterogeneity of a jelly and the production of readily pulverizable masses. Whereas a piece of homogeneous jelly shrinks in such a manner, that all particles of the jelly move, so-to-say, towards a central point, the shrinking of a heterogeneous jelly takes place in such a manner, that in the first place, the many colloidal heterogeneities present in the jelly act as central concentration points so that numberless individual groups and particles are produced and only in a minor degree does a shrinkage towards a common central point take place. The homogeneous jellies according to the concentration of $SiO_2$ present, shrink to a very large extent, for example to about $\frac{1}{10}$ of their original volume, vitreous products having pores of a uniform nature being thus obtained, whilst heterogeneous jellies having a like concentration of $SiO_2$ only shrink to about $\frac{1}{3}$ of their original volume, and not vitreous but sandy products are obtained. The interstices between the separate groups are far greater than those between the particles of the same group. The latter interstices form the active pores, while the former larger ones between the groups as a rule form inactive pores, which only have an influence on the adsorption of vapors from gases, which are nearly saturated with the said vapors, and which pores in this case are also active. Because of the presence of such large inactive cavities, the mechanical solidity of the dry product is so small, that it crumbles when rubbed between the fingers, whilst the dry product from homogeneous jellies is so hard that it can, for example, scratch glass. The powdery or extremely easily pulverizable dry products are suitable both for the purification of liquids and for the adsorption of gases and vapors, whereby these may, for example, be suspended, in a turbulent gas current in the form of dust.

According to whether the hydrogen-ion concentration ($p_H$) value, of the still unshrunken or incompletely shrunken mass is greater or smaller than 7, the methods of operating here described will furnish coarse pored, or fine pored products, the former being after mechanical treatment more particularly adapted for moulding into filtering bodies, Raschig rings, suction filters and the like, which are especially useful in refining oils, hydrocarbons and the like. According to the degree of homogenization obtained by grinding or other mechanical treatment, products of very light weight in the uncompressed condition may be obtained containing, in addition to the fine or wide active (ultra and a microscopical) pores, larger cavities which are generally inactive but nevertheless possess a good capacity for adsorbing vapours from gas and vapour mixtures extensively saturated with vapour. These cavities facilitate the pulverizing of the finished product, which may also be used, in the state of powder, for refining liquids and for the adsorption of gases and vapours.

The following examples will further illustrate the nature of the said invention which however is not limited thereto.

*Example 1*

A solution of sodium carbonate, warmed to from 60° to 80° centigrade is energetically stirred into an aqueous solution of nickel sulphate and magnesium chloride at the same temperature, a precipitate of the carbonates, or basic carbonates, being produced which contains nickel and magnesium, for example in the proportion of 2:1 by weight. The precipitate is purified by repeated levigation and decantation, followed by washing on the suction filter. It is extensively homogenized by prolonged grinding in the porcelain-ball mill, the water content of the paste being about 25 to 35 per cent, smeared into trays, shaped into cubes by stamping or cutting, and dried at from 100° to 120° centigrade, or slowly in vacuo, or more preferably in a current of air of 70° centigrade. The mechanical strength of such a catalyst, which after reduction, may be employed for example in the production of methane from hydrogen and carbon monoxide, is about 10 times as great as that of a corresponding product obtained without mechanical treatment; and this strength may be nearly doubled by pressing the paste.

*Example 2*

Aluminium hydroxide is precipitated from an aluminium nitrate solution by ammonia. The resulting gelatinous alumina is then freed to a large extent, but not completely, from the salts formed during the conversion, by washing, for example, and is pressed, wet-ground, then carefully dried and raised to a higher temperature, the washing and drying being repeated if necessary.

*Example 3*

A solution containing 10 mols of $AlCl_3.6H_2O$ in 2 litres of water is introduced rapidly at ordinary temperature, if possible all at once, and with thorough stirring into a solution of 10 mols of $K_4Fe(CN)_6.3H_2O$ in 15 litres of water. A clear homogeneous sol is thus obtained, which is at once poured into a form made of sheet aluminium, on which in the course of one or two minutes, it solidifies to a fine jelly, which consists of potassium aluminium ferrocyanid. The forms are brought into a vacuum drying cup-board, where the jelly is dried at a temperature of from 80 to 100° C. to a considerable extent, but preferably not completely. In the drying process the jelly breaks up into large-sized lumps, which are then freed from the bulk of potassium chlorid by washing. The large lumps break up into small granules in the washing process. The latter are ground in the ball-mill together with water, whereupon the liquid is removed from the mobile paste by filtration on the suction filter, or in filter press. The cake thus obtained is either dried in vacuo at a temperature of 80° C. or in a current of nitrogen at a temperature of 70° C., and the big lumps then brought to a suitable size of grains by granulating and screening. The grains thus obtained may be employed after suitable reduction and preferably partial decomposition, as a catalyst in the synthesis of ammonia from its elements, or as a preliminary catalyst for purifying the gases before they enter into reaction.

*Example 4*

By treatment in the ball mill the heterogeneous masses, obtainable in the manner described below, can for the most part be homogenized in the moist state without preliminary drying, whereupon they are carefully dried and then brought to a suitable size of grain.

(*a*) A heterogeneous pure jelly is produced from water glass solution and sulfuric acid which after washing has a $p_H$ of about 5. The mass, which has been very considerably homogenized by grinding and which has the consistency of paste, is converted by careful drying into a white mass similar to porcelain, which is extremely hard and is then brought to a suitable size of grain. 100 cubic centimetres of this product, which has a size of grain of from 2 to 4 millimeters, weigh 60 grams whereas the weight of the same volume of product, which has not been homogenized is about 30 grams. The size of grain being the same, 100 cubic centimetres of the fine pored hard product of the nature of porcelain adsorb from a gas current saturated to the extent of 10 per cent with benzene vapors about 10 to 12 grams of benzene, whilst 100 cubic centimetres of the product which has not been homogenized adsorbs, under the same conditions of working, only 2 grams of benzene. If the heterogeneous jellies are very thoroughly homogenized the weight of 100 cubic centimetres of the product is even higher and the product takes more the appearance of glass than of porcelain. If the homogenization is not carried so far, or if bubbles of gas or water vapor be produced within the mixture, for example by the evolution of ammonia gas or carbon dioxid or by more rapid drying, products of the nature of porcelain are obtained of which 100 cubic centimetres are lighter.

(*b*) Either a heterogeneous jelly of pasty or mucous consistency, or a precipitate is prepared by the decomposition of an artificial sodium zeolite or of slags for example, slags obtained as a by-product in the production of phosphorus or slags from ash-melting producers, or of other silicates, for example, kaolin, or clay or crude bleaching earth, phonolite, and the like with acids, for example, concentrated hydrochloric acid and the like, which is then purified by washing. In this process it is often advantageous also to carry out the decomposition in the ball mill, whilst grinding, and then to purify the product by flotation, if desired also accompanied by grinding, and decantation or filtration. The pure product is then ground in the presence of only such an amount of water that a not too thin paste is obtained which is then carefully dried. In the grinding process also other substances, for example, small amounts of water glass, ammonia, alkalis, peptizing agents and the like may be added.

(*c*) One part, by volume, of a solution of water glass having the specific weight 1.36 is allowed to run slowly into 2 parts, by volume, of sulfuric acid of 10 per cent strength while stirring moderately at any desired temperature, for example 20° C., or both solutions are poured together, care being taken that the mixture always shows an acid reaction against methyl orange. The gritty precipitate is separated from the mother liquid and then washed on the suction filter with distilled water, whereupon it is homogenized in the ball mill in order to produce hard fine-pored products, and then dried.

(*d*) The slightly acid precipitate, obtainable according to Example 4*c* is treated after being purified for the purpose of preparing hard coarse pored products with the addition of so much alkali or water glass in the ball mill that the $p_H$ of the paste lies between 8 and 9, and then dried.

What we claim is:—

1. The process of producing hard highly active adsorbents and catalytic masses which comprises mechanically homogenizing a washed heterogeneous jelly in a moist state until a homogeneous paste is obtained and drying the paste.

2. The process of producing hard highly adsorbent silica which comprises mechanically homogenizing a washed heterogeneous silica jelly in a moist state until a homogeneous paste is obtained and drying the paste.

3. The process of producing hard highly adsorbent silica which comprises mechanically homogenizing a washed heterogeneous paste of a slightly acid reaction in a moist state until a homogeneous paste is obtained and drying the paste.

In testimony whereof we have hereunto set our hands.

FRITZ STOEWENER.
ERNST MÜNZING.

CERTIFICATE OF CORRECTION.

Patent No. 1,760,289.   Granted May 27, 1930, to

FRITZ STOEWENER ET AL.

It is hereby certified that error appears in the printed specification of the above numbered patent requiring correction as follows: Page 1, line 41, strike out the word "silica"; page 2, line 24, beginning with the words "The purification" strike out all through and including the word "dust" in line 67; and that the said Letters Patent should be read with these corrections therein that the same may conform to the record of the case in the Patent Office.

Signed and sealed this 17th day of November, A. D. 1931.

(Seal)

M. J. Moore,
Acting Commissioner of Patents.

What we claim is:—

1. The process of producing hard highly active adsorbents and catalytic masses which comprises mechanically homogenizing a washed heterogeneous jelly in a moist state until a homogeneous paste is obtained and drying the paste.

2. The process of producing hard highly adsorbent silica which comprises mechanically homogenizing a washed heterogeneous silica jelly in a moist state until a homogeneous paste is obtained and drying the paste.

3. The process of producing hard highly adsorbent silica which comprises mechanically homogenizing a washed heterogeneous paste of a slightly acid reaction in a moist state until a homogeneous paste is obtained and drying the paste.

In testimony whereof we have hereunto set our hands.

FRITZ STOEWENER.
ERNST MÜNZING.

CERTIFICATE OF CORRECTION.

Patent No. 1,760,289.   Granted May 27, 1930, to

FRITZ STOEWENER ET AL.

It is hereby certified that error appears in the printed specification of the above numbered patent requiring correction as follows: Page 1, line 41, strike out the word "silica"; page 2, line 24, beginning with the words "The purification" strike out all through and including the word "dust" in line 67; and that the said Letters Patent should be read with these corrections therein that the same may conform to the record of the case in the Patent Office.

Signed and sealed this 17th day of November, A. D. 1931.

(Seal)

M. J. Moore,
Acting Commissioner of Patents.